(12) United States Patent
Mo et al.

(10) Patent No.: US 8,493,131 B2
(45) Date of Patent: Jul. 23, 2013

(54) CAPACITIVE TOUCH PANEL DETECTION CIRCUIT AND BOOST CIRCUIT THEREOF

(75) Inventors: Lianghua Mo, Shenzhen (CN); Wenping Liu, Shenzhen (CN)

(73) Assignee: Focaltech Systems Ltd., Grand Cayman (KY)

( * ) Notice: Subject to any disclaimer, the term of this patent is extended or adjusted under 35 U.S.C. 154(b) by 19 days.

(21) Appl. No.: 12/932,581

(22) Filed: Feb. 28, 2011

(65) Prior Publication Data

US 2011/0227633 A1  Sep. 22, 2011

(30) Foreign Application Priority Data

Mar. 17, 2010 (CN) .......................... 2010 1 0126435

(51) Int. Cl.
*G11C 5/14* (2006.01)
(52) U.S. Cl.
USPC ......................................................... 327/530
(58) Field of Classification Search
USPC ................... 327/530, 534–538, 543; 363/59, 363/60
See application file for complete search history.

(56) References Cited

U.S. PATENT DOCUMENTS 7,369,419 B2 * 5/2008 Erbito, Jr. ........................ 363/60
2010/0117961 A1 * 5/2010 Westerman ................... 345/163

* cited by examiner

*Primary Examiner* — Lincoln Donovan
*Assistant Examiner* — Sibin Chen
(74) *Attorney, Agent, or Firm* — Raymond Y. Chan; David and Raymond Patent Firm (57) ABSTRACT

The invention discloses a capacitive touch panel detection circuit and a boost circuit thereof, wherein the boost circuit comprises a plurality of charge pumps in series, a sequence circuit and a voltage-stabilizing circuit. The charge pump comprises a first switch, a second switch, a third switch, a fourth switch, a first capacitor and a second capacitor. The switches are controlled by the sequence circuit. During the first half of the working cycle of the charge pump, the first capacitor is charged. During the second half of the working cycle of the charge pump, the second capacitor is charged so that the voltage is two times of the power voltage, after the first capacitor is connected with the power supply in sequence. The boost circuit of the invention does not need an induction and a Schottky diode. All of the capacitors except a voltage-stabilizing capacitor can be integrated into a chip. Therefore, the number of off-chip ancillary components can be reduced. Furthermore, the problem of electromagnetic interference in an inductive boost circuit can be solved.

3 Claims, 7 Drawing Sheets

Figure 1

PRIOR ART

Figure 2

PRIOR ART

PRIOR ART

Figure 3

PRIOR ART

Figure 4

PRIOR ART

CAPACITIVE TOUCH PANEL DETECTION CIRCUIT AND BOOST CIRCUIT THEREOF

BACKGROUND OF THE PRESENT INVENTION

1. Field of Invention

The invention relates to a touch technique, in particular to a capacitive touch panel detection circuit and a boost circuit thereof.

2. Description of Related Arts

In the 1970s, U.S. Military firstly utilized the technique of touch panel in the military field. Since then, this technique has been gradually turned to the civilian field. With the development of network techniques and the popularization of the internet, people successively witnessed the emerging of the new generation of the touch technique and products which attract the users with their advantages of hardness and durability, rapid response, space saving and easy communication. At present, these relaxing human-computer interaction techniques have be used in many other fields. Except the field of personal portable information products (such as the handwriting input technique of PC, PDA, AV and so on), these techniques have been used in the fields such as information appliance, public information (such as the business inquiries from the departments of e-government affairs, banks, hospitals, electric sectors and so on), computer games, communication apparatuses, office automation equipment, data collection facilities, industrial equipment and so on.

With the rapid development of the consumer electronics such as mobile phones, computers and so on, the touch technique has attracted more and more people and its application fields have been ever-increasing. It has become the most popular input method accepted easily by the users besides the input methods such as keyboard, mouse, handwriting board and voice input. With the technique, the users can operate the host machine only by hands slightly touching the patterns or words displayed on the display screen of the computer; therefore, the human-computer interaction technique becomes belief and to the point. The technique offers great convenience for the users. It is suitable for multi-media inquiries very much. Meanwhile, the human-computer interaction method offers new appearance for the multi-media which are the most attractive and new multi-media interaction equipment. Wherein as multi-touch can be realized by the capacitive touch equipment, functions with more features can be realized. Furthermore, it does not need physical deformation. Therefore, it has the advantages of longer service life and better touch and becomes a rising star in the market of touch equipment with great prospect in the future.

Figure 1:
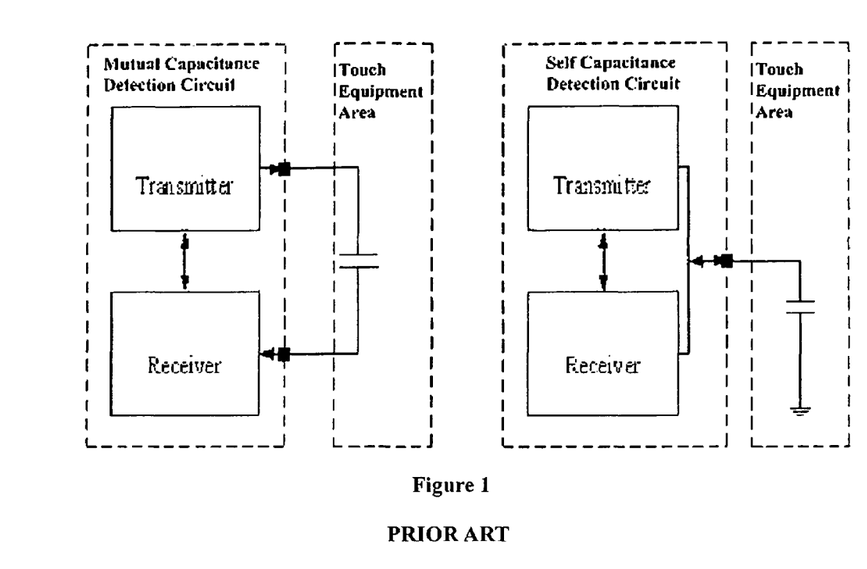
FIG. 1 is a schematic diagram of the distinctive characteristics of the self capacitance detection and mutual capacitance detection of the prior art.

In FIG. 1, the capacitive touch equipment can be divided into self-capacitance detection and mutual capacitance detection. The mutual capacitance detection is such that the changes of coupled capacitance between different rows (columns) are detected when there is touch action. Its principle is as follows: one end of the mutual capacitance is connected with a transmitter and sends out scanning signals, and the other end of the capacitance is a receiver, sends out responses reacted to the scanning signals and calculates the amplitude of the responses. When the changes of the outside world causes the changes of the capacitance values (such as the changes caused by the touch of human body), the amplitude of the responses of the receiver changes, and then the capacitance of the corresponding coordinates can be determined to have been changed. The detection is processed by MCU, and after that, the detection process is completed.

The principle of the self-capacitance detection is such that one end (it is not only a transmitter but also a receiver) of the self-capacitance (the capacitance between wires and the ground) at the same row (column) of a touch apparatus is connected with a detection apparatus, and the other end is connected with the ground. When touch occurs, the capacitance formed by the human body connected with the ground is connected with the self-capacitance on the touch apparatus in parallel, and the equivalent capacitance is increased. At the same time, the response voltage (or response charges and response time) received by the receiver changes, so that touch implemented at the row (column) can be obtained. With the scanning for full screen, the rows and columns positioned by the touch points can be obtained. And then the specific coordinates of the touch points can be obtained.

In order to resist the noise interferences such as RF and increase signal to noise ratio, a relatively sound method is to increase the voltage of the scanning signals. However, many product terminals adopt the power with relatively low voltage to decrease power consumption. Therefore, the boost circuit is needed.

Figure 2:
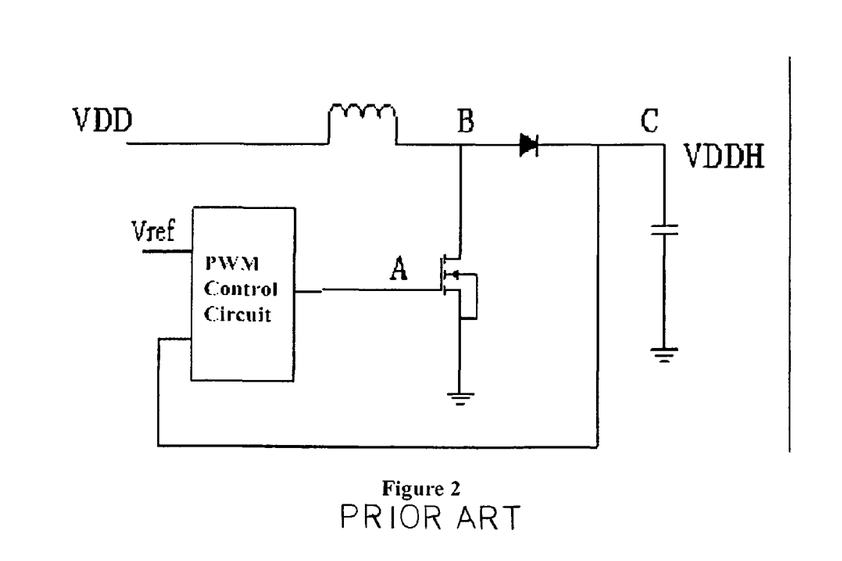
FIG. 2 is a schematic diagram of a boost circuit of the prior art.

FIG. 2 illustrates a typical boost circuit. It consists of low voltage power supply, an inductor, a Schottky diode, a capacitor, a sequence control circuit and an output-power transistor. A PWM control circuit can send out periodic square waves such as the waveform at A point shown in FIG. 3. When the voltage at A point is in high level, the current of VDD passes through the inductor, a MOS transistor and the ground; furthermore, the current will be increased gradually. At this time, the Schottky diode does not conduct. When the voltage at A point is in failing edge, the MOS transistor is closed. With the inductor, the current is not decreased to 0 immediately, and the voltage at B point is increased rapidly. The Schottky diode does not conduct until the voltage at B point is by 0.2V higher than the voltage at C point. The Schottky diode conducts, and the current is passed to the capacitor. The output voltage at C point is increased, and the voltage at B point is increased correspondingly. Meanwhile, the voltage at C point is detected by the control circuit. If the voltage does not exceed set voltage (VDDH), A point is maintained in the low level, and the capacitor is continuously charged. Otherwise, A point is in high level; the MOS transistor conducts; the voltage at B point is decreased to 0, and the Schottky diode is closed. The voltage at C point is maintained by the capacitor. The loads are charged. The voltage is decreased slowly. The above processes are not repeated until the failing edge of the next half of the cycle is present.

Figure 3:
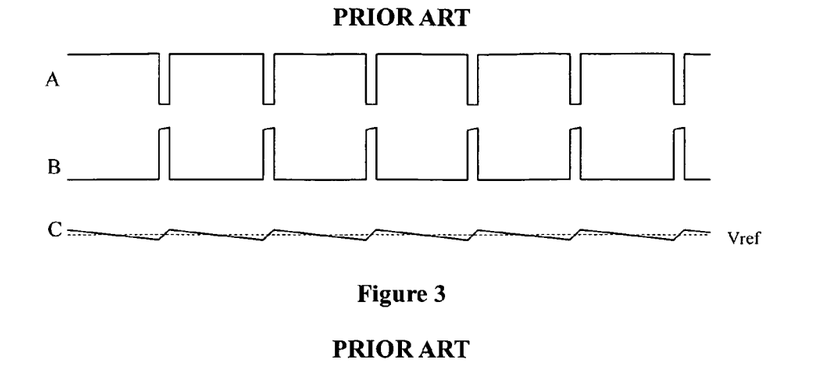
FIG. 3 is an oscillogram of a node of a boost circuit of the prior art.

FIG. 3 illustrates a capacitive touch panel detection circuit which is the most popular in the market. This is a mutual capacitance detection circuit consisting of three ICs: a boost circuit, a transmitter circuit and a receiver circuit. With them, the relatively high voltage can respectively be obtained; the scanning signals are sent out to a touch panel, and the scanning signals are responded. Where, an off-chip inductor, a Schottky diode and a capacitor are needed to match with the boost circuit, and the boost circuit is needed to occupy two package pins (that is, boost and sense). The capacitive touch panel detection circuit has the following shortages:

Three ICs are needed to realize the detection functions with the disadvantages of high cost and big occupied area of a circuit board.

The boost circuit needs an inductor, a capacitor, Schottky diode and two package pins. There are many off-chip ancillary components.

An inductive boost circuit has the problem of EMI (electromagnetic interference).

SUMMARY OF THE PRESENT INVENTION

The technical problem to be solved by this invention is to provide a boost circuit of a capacitive touch panel detection circuit with less off-chip ancillary components and less electromagnetic interference.

The other technical problem to be solved by this invention is to provide a capacitive touch panel detection circuit with less off-chip ancillary components and less electromagnetic interference.

In order to solve the above technical problems, the technical proposal adopted in the invention is as follows: a boost circuit for a capacitive touch panel detection circuit comprises a plurality of charge pumps in series, a sequence circuit and a voltage-stabilizing circuit, wherein the charge circuit comprises a first switch, a second switch, a third switch, a fourth switch, a first capacitor and a second capacitor. The first end of the first switch is connected with the first end of the third switch in sequence and taken as an input end of the charge pump. The second end of the first switch is connected with the first end of the second switch. The second end of the third switch is connected with the first end of the fourth switch. The first capacitor is connected between the second ends of the first and third switches. The second end of the fourth switch is connected with the ground. One end of the second capacitor is connected with the second end of the second switch, and the other end is connected with the ground. The second end of the second switch serves as the output end of the charge pump. The said switch is controlled by the sequence circuit. During the first half of working cycle, the first and the fourth switches are closed, and the second and the third switches are open. During the second half of the working cycle of the charge pump, the first and the fourth switches are open, and the second and the third switches are closed.

The abovementioned boost circuit for a capacitive touch panel detection circuit comprises an off-chip voltage-stabilizing capacitor comprising a LDO linear regulator. The output end of the final-stage charge pump is connected with the power end of a LDO linear regulator. The control end of the LDO linear regulator is connected with the reference voltage. The output end of the LDO linear regulator serves as the output end of the boost circuit. One end of the off-chip voltage-stabilizing capacitor is connected with the output end of the LDO linear regulator, and the other end is connected with the ground. All of the circuit components of the boost circuit except the off-chip voltage-stabilizing capacitor are integrated into an IC chip.

The abovementioned boost circuit for a capacitive touch panel detection circuit comprises an off-chip voltage-stabilizing capacitor. The voltage-stabilizing circuit comprises a voltage sampling circuit and a comparator. The sampling end of the voltage sampling circuit is connected with the output end of the final-stage charge pump. One signal input end of the comparator is connected with the signal input end of the voltage sampling circuit, and the other signal input end is connected with the reference voltage. The output end of the comparator is connected with the control signal end of a sequence circuit. When the output voltage of the final-stage charge pump exceeds the set voltage, the charge pump is closed by the output control signals from the comparator through the sequence circuit. One end of the off-chip voltage-stabilizing capacitor is connected with the output end of the final-stage charge pump, and the other end is connected with the ground. The off-chip voltage-stabilizing capacitor also serves as a second capacitor of the final-stage charge pump. All of circuit components of the boost circuit except the off-chip voltage-stabilizing capacitor are integrated into an IC chip.

For the abovementioned boost circuit for a capacitive touch panel detection circuit, the switching frequency of a switch of a previous-stage charge pump is higher than that of the switch of the next-stage charge pump.

The technical proposal of a capacitive touch panel detection circuit is such that the detection circuit comprises a boost circuit, a scanning circuit and a receive circuit. The boost circuit is the abovementioned boost circuit. The boost circuit, the scanning circuit and the receiving circuit are all integrated into an IC chip.

The boost circuit of a capacitive touch panel detection circuit of the invention does not need an inductor and a Schottky diode. All the needed capacitors except the voltage-stabilizing capacitor can be integrated into a chip. Therefore, the number of off-chip ancillary components can be reduced. Furthermore, the problem of the electromagnetic interference of an inductive boost circuit can be solved.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 4:
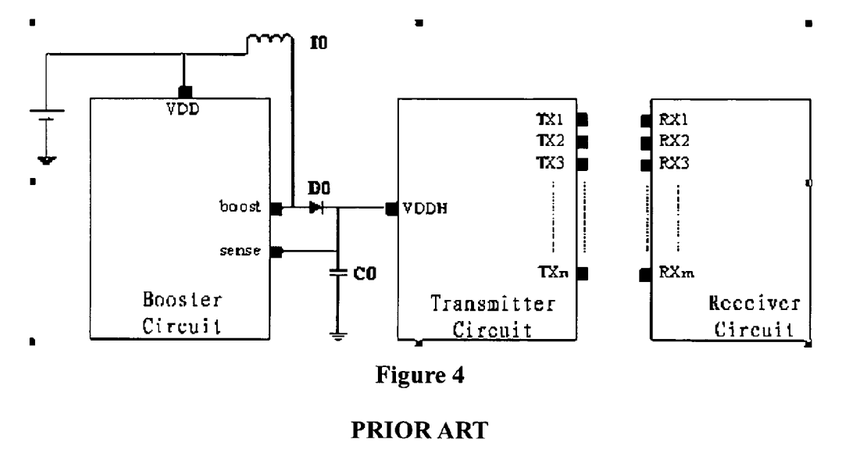
FIG. 4 is a schematic diagram of a capacitive touch panel detection circuit of the prior art.
Figure 5:
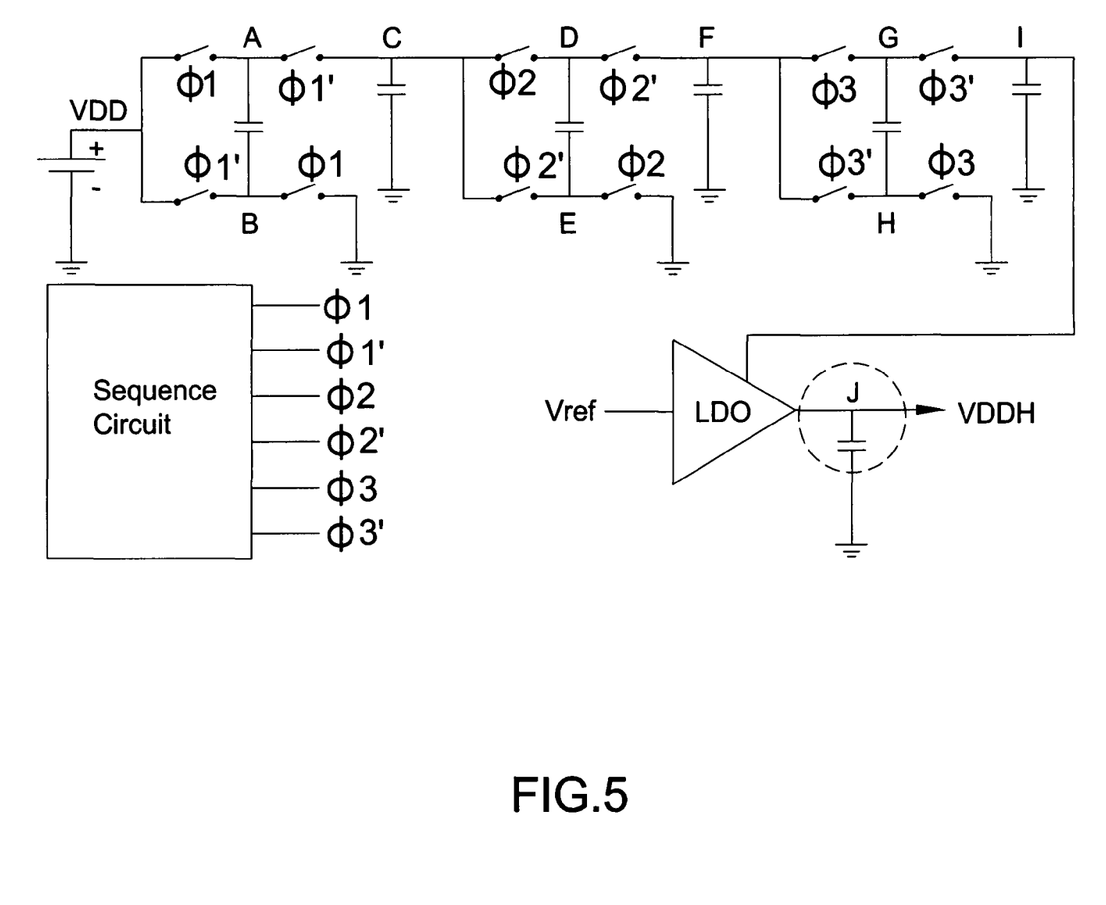
FIG. 5 is a schematic diagram of a boost circuit of a capacitive touch panel detection circuit according to a first preferred embodiment of the present invention.

FIG. 5 illustrates a boost circuit of a capacitive touch panel detection circuit according to a first preferred embodiment of the invention. The boost circuit adopts a charge pump (a switched capacitor voltage converter) to replace the inductive boost circuit in FIG. 2. It has the advantages that: the capacitor in the invention can be integrated into the inner part of a chip, while the inductor in FIG. 3 can not be integrated or the process cost is high; a Schottky diode with high voltage and high power is also difficult to be integrated into the inner part of the chip. A typical embodiment of an eight-time charge pump is shown in FIG. 4. It mainly comprises a sequence circuit, a switch (MOS transistor), a capacitor and a LDO linear regulator. For the capacitor part, except a voltage-stabilizing capacitor J of VDDH in a dashed frame, others are all internal capacitors. It is a three-stage boost circuit with the voltage increased by two times each stage under the ideal conditions. That is, the voltage at C point is 2×VDD; the voltage at F point is 4×VDD, and the voltage at I point is 8×VDD. Of course, with parasitic resistances of a switch and a routing and loads, the actual voltage is slightly lower than the above values.

Figure 6:
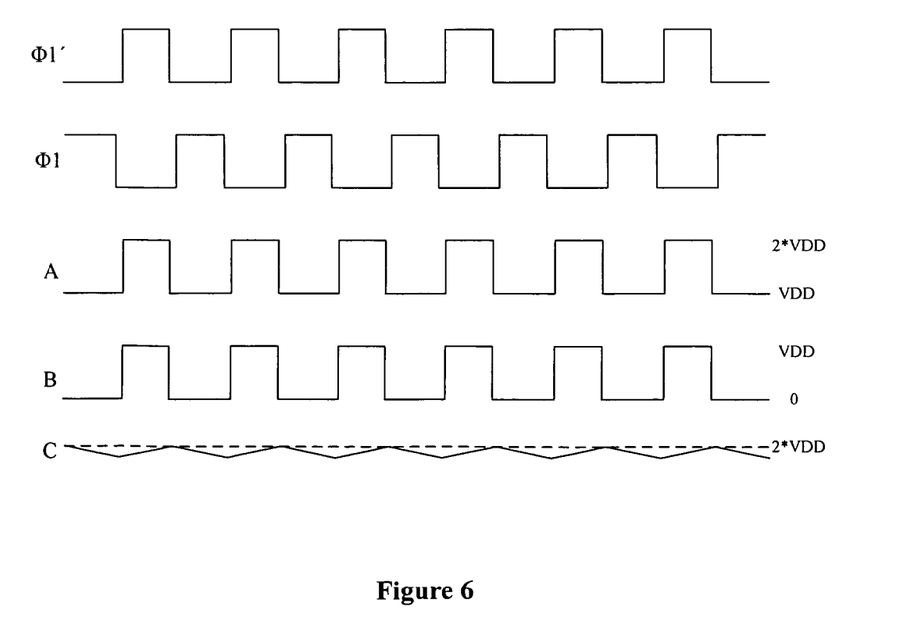
FIG. 6 are oscillograms of voltage and a sequential circuit of a first stage charge pump of a boost circuit of a capacitive touch panel detection circuit according to the first embodiment of the present invention.

The operation principle of the charge pump is illustrated by an example of a first-stage charge pump in belief as follows: for a working sequence of the switch and the voltage waveform of nodes shown in FIG. 6, when the output Φ1 of a sequence circuit is in high level, a control switch Φ1 conducts; when Φ1' is in low level, the control switch Φ1' is open. A point and B point are respectively connected with VDD and the ground. The voltage of the first capacitor between A and B is charged to VDD. The output Φ1 of the sequence circuit in the second half circle is in low level; Φ1' is in high level. the switch Φ1 is open; the switch Φ1' conducts; the voltage at the B point is VDD, and then the voltage at A point on top crown of the capacitor is increased to 2×VDD and the voltage of the second capacitor at C point is also charged to 2×VDD. When the next circle comes; Φ1 is in high level; Φ1' is in low level; the voltage at C point is maintained by the capacitor, the stable voltage of 2×VDD can be obtained. The waveforms of A point, B point and C point are shown in FIG. 6. Likewise, F point of a second charge pump is increased by two times based on the voltage of C point again. The voltage is increased by a third-stage charge pump again, and then the voltage of 8×VDD at L point can be obtained.

In order to decrease the number of package pins and off-chip components, on-chip capacitor is used in all of the boost circuits. The value of the off-chip capacitance can reach 1 μF. For the limitation of the area, the value of the on-chip capacitance is generally within 1 nF, which affects the output voltage values and drive capability. However, the shortage in capacitance values can be covered by the increase of switching frequency.

The relation of the switching frequency between the charge pumps at each stage is as follows: a first-stage switching frequency is two times as high as a second-stage switching frequency, and the second-stage switching frequency is two times as high as a third-stage switching frequency. Taking the first-stage and second-stage switching frequencies for example, under the ideal conditions, the voltage at C point is 2×VDD; the voltage at F point is 4×VDD, and the voltage at F point is two times as high as that of C point. According to the principle of energy conservation (P=U×I), and when an output end has loads, the current flowing out of the first-stage charge pump is two times as high as that of the second-stage charge pump. Considering that the capacities of the off-chip capacitors are the same, the decrease speed of the voltage of a second capacitor is two times as high as that of the second capacitor at F point. The decrease value of the voltage at C point is amplified by the second charge pump, so that more decrease of the voltage at F point is obtained. Therefore it is disadvantageous for the final voltage of the boost circuit, and the voltage is less greatly than the expected values. Hence, the first-stage switching frequency should be increased; the capacitor of the first stage charge pump can be charged in time, and the relatively high voltage can still be maintained under the load action. The frequency relations between the second-stage charge pump and a third-stage charge pump are the same. The output levels Φ and Φ' of the sequence circuit are non-overlapping clocks. They can not be in high levels at the same time.

As all of the switches do not conduct during the complete cycle, all of the voltages of the voltage-stabilizing capacitor are in zigzag-shape, and their amplitudes are affected by the loads, such as the voltage at C point in FIG. 5. After the voltage of 8×VDD is obtained at I point, the LDO regulator and the off-chip capacitor J should be passed through, so that an accurate and stable voltage can be given to a scanning circuit as power. The output end of the LDO of a final-stage charge pump is connected with the power end of the boost circuit. The input end of the control signal of the LDO is connected with the reference voltage, and the output end of the LDO serves as the output end of the boost circuit. One end of the off-chip stabilized voltage J is connected with the output end of the LDO, and the other end is connected with the ground. All of the circuit components of the boost circuits except an off-chip voltage-stabilizing capacitor are integrated into an IC chip.

Figure 7:
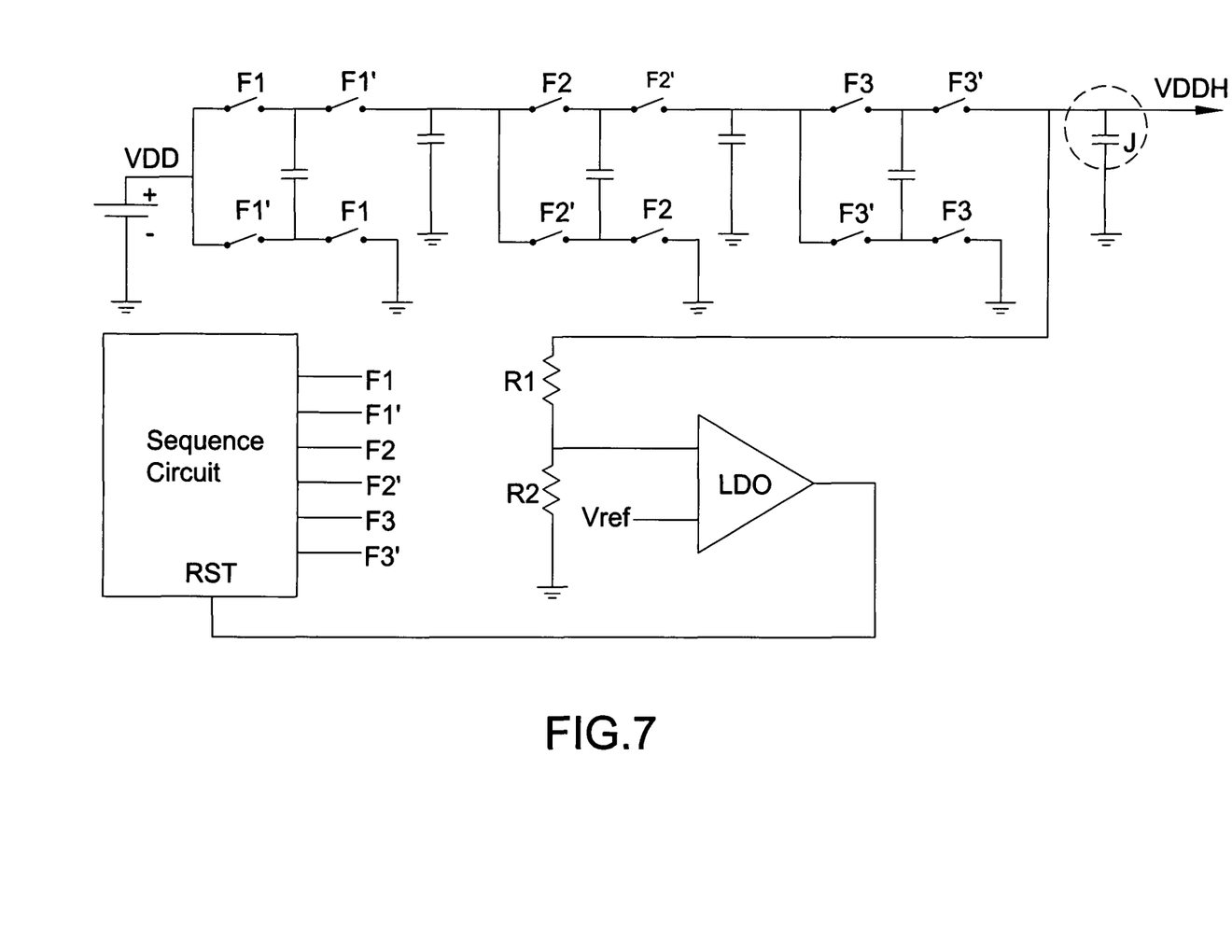
FIG. 7 is a schematic diagram of a boost circuit of a capacitive touch panel detection circuit according to a second preferred embodiment of the invention.

FIG. 7 illustrates a boost circuit of a capacitive touch panel detection circuit according to the second embodiment of the invention. In the second embodiment, an off-chip capacitor J also serves as the second capacitor of a final-stage charge pump. Therefore, comparing with that in FIG. 5, one on-chip capacitor (the second capacitor at the original I point) is reduced. Furthermore, under the light loading conditions, part of the time of the switched capacitor is in the conditions of charge-discharge stop, which reduces power consumption.

In a second preferred embodiment, a voltage-stabilizing circuit comprises a voltage sampling circuit and a comparator. Resistors R1 and R2 are connected with each other in series and form the voltage sampling circuit. The sampling end of the voltage sampling circuit is connected with the output end of the final-stage charge pump. The inverting input end of the comparator is connected with the connection points (that is, the output ends of the signals) of resistors R1 and R2 of the voltage sampling circuit, and the non-inverting input end is connected with the reference voltage (Vref). The output end of the comparator is connected with the control signal input end of the sequence circuit. VDDH is detected by the voltage-stabilizing circuit. When the voltage of the VDDH exceeds n×Vref [n=(R1+R2)/R2], the output of the comparator becomes 0, and the sequence circuit is controlled by the voltage-stabilizing circuit, which stops the output of the switch signals (Φ1~Φ3, Φ1'~Φ3') of the boost circuit while power is not consumed substantially. The charging charge can not be obtained by the voltage-stabilizing capacitor J of the VDDH while current is still consumed by the loads. Therefore, the voltage of the VDDH starts to be decreased; the output of the comparator becomes 1; the sequence circuit continues to send out the switch signals; the VDDH starts to increase again, and so on. As the gain of the comparator is finite, the voltage of the VDDH fluctuates within a very narrow range. If the gain is 1000, the fluctuation range is within 1.001 n×Vref~0.999 n×Vref. That is, when the VDDH is increased to 1.001 n×Vref, the output of the comparator becomes 0 and the boost circuit stops working; when VDDH decreases to 0.999 n×Vref, the output of the comparator becomes 1, and the boost circuit starts to work again. The requirement of the gain of the comparator depends on the requirement of the power precision demanded by the loads. In this embodiment, all of the circuit components of the boost circuit except the off-chip voltage-stabilizing capacitor J are integrated in an IC chip.

Figure 8:
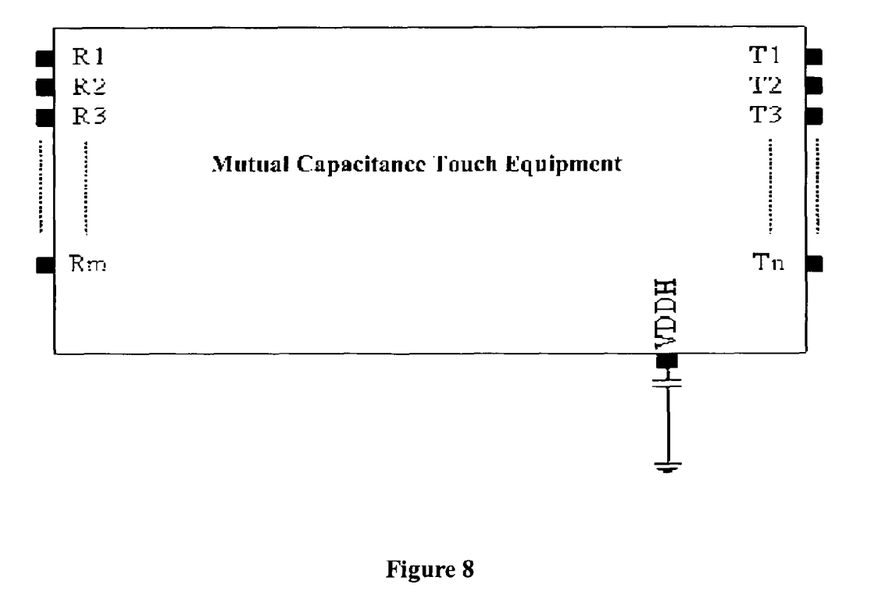
FIG. 8 is a schematic diagram of main pins of the detection circuit IC of a capacitive touch panel according to a third preferred embodiment of the present invention.
Figure 9:
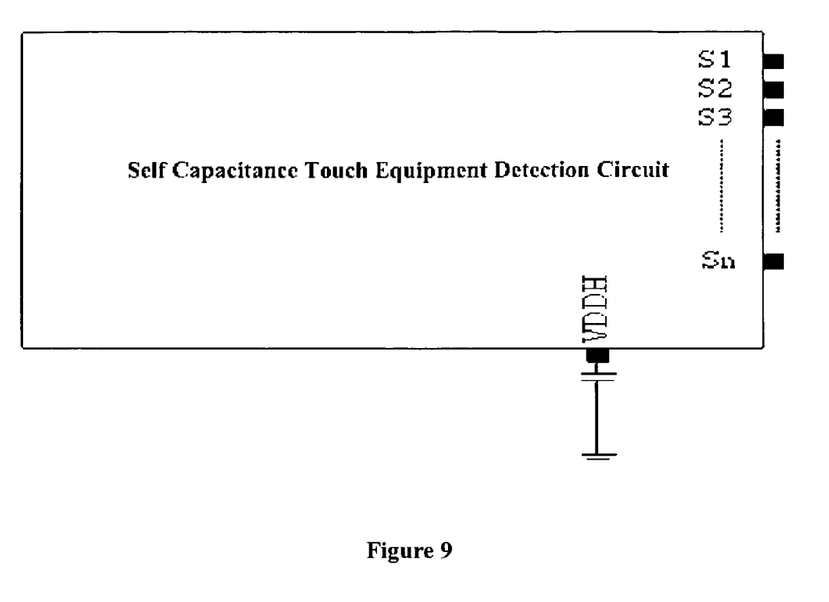
FIG. 9 is a schematic diagram of main pins of the detection circuit IC of a capacitive touch panel according to a fourth preferred embodiment of the present invention.

The FIGS. 8 and 9 illustrate a capacitive touch panel detection circuit according to the third and fourth embodiments of the invention. The boost circuit, the scanning circuit and the receiving circuit are integrated into a mutual capacitance detection circuit in one chip, as shown in FIG. 8. For the mutual capacitance touch panel apparatus with m columns and n rows, m receivers and n transmitters are needed. Self capacitance detection circuit is shown in FIG. 9. For the self capacitance touch panel apparatus with n rows and columns, n transmitters/receivers are needed.

In a third and a fourth preferred embodiments, through the integration of the boost circuit, the scanning circuit and the receiving circuit, IC power, the pins between communication interfaces, package materials and the working procedures (such as detection, tests and so on) can be reduced. The boost capacitor is built in, and the pins of IC can also be reduced.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A capacitive touch panel detection circuit, comprising a boost circuit, a scanning circuit and a receiving circuit, wherein the boost circuit comprises a plurality of charge pumps in series, a sequence circuit and a voltage-stabilizing circuit, the charge pump comprising a first switch, a second switch, a third switch, a fourth switch, a first capacitor, and a second capacitor, the first end of the first switch being connected with the first end of the third switch in sequence as an input end of the charge pump, the second end of the first switch being connected with the first end of the second switch, the second end of the third switch being connected with the first end of the fourth switch, the first capacitor being connected between the second ends of the first and the third switches, the second end of the fourth switch being connected with the ground, one end of the second capacitor being connected with the second end of the second switch, the other end being connected with the ground, the second end of the second switch serving as an output end of the charge pump, the switches being controlled by the sequence circuit, during the first half working cycle of the charge pump, the first and the fourth switches being closed, and the second and the third switches being open, during the second half of the working cycle of the charge pump, the first and the fourth switches being open, and the second and the third switches being closed, wherein the boost circuit, the scanning circuit and the receiving circuit are all integrated into an IC chip, wherein said boost circuit for the capacitive touch panel detection circuit further comprises an off-chip voltage-stabilizing capacitor which comprises a low dropout (LDO) linear regulator, the output end of a final-stage charge pump being connected with the power end of a LDO linear regulator, the control end of the LDO linear regulator being connected with the reference voltage, the output end of the LDO linear regulator serving as the output end of the boost circuit, one end of the off-chip voltage-stabilizing capacitor being connected with the output end of the LDO linear regulator, the other end being connected with the ground, all of circuit components of the boost circuit except the off-chip voltage-stabilizing capacitor being integrated into an IC chip.

2. A capacitive touch panel detection circuit, comprising a boost circuit, a scanning circuit and a receiving circuit, wherein the boost circuit comprises a plurality of charge pumps in series, a sequence circuit and a voltage-stabilizing circuit, the charge pump comprising a first switch, a second switch, a third switch, a fourth switch, a first capacitor, and a second capacitor, the first end of the first switch being connected with the first end of the third switch in sequence as an input end of the charge pump, the second end of the first switch being connected with the first end of the second switch, the second end of the third switch being connected with the first end of the fourth switch, the first capacitor being connected between the second ends of the first and the third switches, the second end of the fourth switch being connected with the ground, one end of the second capacitor being connected with the second end of the second switch, the other end being connected with the ground, the second end of the second switch serving as an output end of the charge pump, the switches being controlled by the sequence circuit, during the first half working cycle of the charge pump, the first and the fourth switches being closed, and the second and the third switches being open, during the second half of the working cycle of the charge pump, the first and the fourth switches being open, and the second and the third switches being closed, wherein the boost circuit, the scanning circuit and the receiving circuit are all integrated into an IC chip, wherein said boost circuit for the capacitive touch panel detection circuit further comprises an off-chip voltage-stabilizing capacitor which comprises a voltage sampling circuit and a comparator, the sampling end of the voltage sampling circuit being connected with the output end of a final-stage charge pump, one signal input end of the comparator being connected with the signal output end of the voltage sampling circuit, the other signal input end being connected with the reference voltage, the output end of the comparator being connected with the control signal end of the sequence circuit, when the output voltage of the final-stage charge pump exceeds the set voltage, the charge pump being closed by the output control signals from the comparator through the sequence circuit, one end of the off-chip voltage-stabilizing capacitor being connected with the output end of the final-stage charge pump, the other end being connected with the ground, the off-chip voltage-stabilizing capacitor serving as the second capacitor of the final-stage charge pump, all of the circuit components of the boost circuit except the off-chip voltage-stabilizing capacitor being integrated into an IC chip.

3. A capacitive touch panel detection circuit, comprising a boost circuit, a scanning circuit and a receiving circuit, wherein the boost circuit comprises a plurality of charge pumps in series, a sequence circuit and a voltage-stabilizing circuit, the charge pump comprising a first switch, a second switch, a third switch, a fourth switch, a first capacitor, and a second capacitor, the first end of the first switch being connected with the first end of the third switch in sequence as an input end of the charge pump, the second end of the first switch being connected with the first end of the second switch, the second end of the third switch being connected with the first end of the fourth switch, the first capacitor being connected between the second ends of the first and the third switches, the second end of the fourth switch being connected with the ground, one end of the second capacitor being connected with the second end of the second switch, the other end being connected with the ground, the second end of the second switch serving as an output end of the charge pump, the switches being controlled by the sequence circuit, during the first half working cycle of the charge pump, the first and the fourth switches being closed, and the second and the third switches being open, during the second half of the working cycle of the charge pump, the first and the fourth switches being open, and the second and the third switches being closed, wherein the boost circuit, the scanning circuit and the receiving circuit are all integrated into an IC chip, wherein the switching frequency of a previous-stage charge pump switch is higher than that of the next-stage charge pump switch.

* * * * *